United States Patent [19]

Devona et al.

[11] Patent Number: 4,946,891

[45] Date of Patent: Aug. 7, 1990

[54] SEMI-CONTINUOUS EMULSION POLYMERIZATION PROCESS

[75] Inventors: James E. Devona, Mt. Prospect; Gregory D. Shay, Oak Forest, both of Ill.

[73] Assignee: DeSoto, Inc., Des Plaines, Ill.

[21] Appl. No.: 269,704

[22] Filed: Nov. 10, 1988

[51] Int. Cl.$^5$ ...................... C08F 2/22; C08F 218/08
[52] U.S. Cl. ................................ 524/833; 524/804; 524/832; 526/65; 526/66; 526/80; 526/87; 526/88; 526/318.44; 526/329.5; 526/909
[58] Field of Search ...................... 526/80, 81, 87, 88, 526/329.5, 65, 66; 524/804, 832, 833

[56] References Cited

U.S. PATENT DOCUMENTS

| | | | |
|---|---|---|---|
| 2,587,562 | 2/1952 | Wilson | 526/65 |
| 3,546,154 | 12/1970 | Hwa et al. | 526/81 X |
| 4,219,454 | 8/1980 | Iacoviello et al. | 526/329.5 X |
| 4,301,264 | 11/1981 | Moore et al. | 526/65 |

FOREIGN PATENT DOCUMENTS 0016502  2/1981  Japan ...................... 526/66

*Primary Examiner*—Joseph L. Schofer
*Assistant Examiner*—F. M. Teskin
*Attorney, Agent, or Firm*—Dressler, Goldsmith, Shore, Sutker & Milnamow, Ltd.

[57] ABSTRACT

A method of carrying out a continuous aqueous emulsion copolymerization using a single continuously stirred tank reactor to reduce the particle size distribution and the presence of over-sized particles comprises, slowly supplying to a reactor the materials used in the copolymerization, including the monomers which are copolymerized, while maintaining conditions causing copolymerization to proceed until the reactor is filled. The supply is continued while maintaining those conditions until the total supply is in the range of from about 1.5 to about 5 reactor volumes. The excess material in the reactor is removed therefrom and collected in one or more separate vessels, and the product of the copolymerization is then combined and mixed to form a uniform product. The composition copolymerized can be changed during the copolymerization. The emulsion copolymer product is particularly useful in latex paints where it improves the gloss and scrub resistance of the paint.

9 Claims, 1 Drawing Sheet

SEMI-CONTINUOUS EMULSION POLYMERIZATION PROCESS

DESCRIPTION

1. Technical Field

This invention relates to the production of aqueous emulsion copolymers, especially for use in aqueous latex paints.

2. Background Art

Aqueous emulsion copolymerization is well known, it being traditional to carry out the polymerization on a batch basis. In recent years, however, continuous polymerization has been used in order to obtain the economies and increased productivity associated with continuous production. A preferred method for continuous processing involves the use of a single continuously stirred tank reactor which affords operating simplicity and minimal equipment investment. This type of process is described, for example, in U.S. Pat. No. 3,296,168 to Jirik et al. Such a process can generate a product without interruption. Unfortunately, and despite many efforts to modify continuous processing using a single tank to insure the production of high performance products on a consistent basis, two prime limitations have not previously been avoidable.

First, the known continuous process using a single continuously stirred tank reactor usually generates wide particle size distribution, and many over-sized particles are present. The excessive particle size distribution and the over-sized particles detract from gloss and scrub resistance when the aqueous emulsion copolymer product is used in aqueous latex paints. One method for controlling this problem is the use of a seed latex which can be added to the reactor continuously. This method is described in U.S. Pat. No. 4,022,744 to D'Achille et al. The seed latex can be pre-formed and stored for use or it can be generated in a batch or tubular reactor and fed into the main reactor during a continuous run. This technique does give some narrowing and reduction of the particle size but not enough to overcome gloss and scrub resistance deficiencies in the aqueous latex paints made from these emulsion polymers. The results of this technique will be illustrated later.

Second, the continuous process produces a nearly constant composition from start to finish. As a result, "core-shell" structures and other desirable non-uniform copolymers cannot be produced by the process.

This invention overcomes these limitations in the known single continuously stirred tank reactor process without unduly sacrificing the economies of continuous processing.

SUMMARY OF THE INVENTION

In this invention, aqueous emulsion copolymerization is carried out on a semi-continuous basis using a single continuously stirred tank reactor in which, as is conventional, the materials being copolymerized (monomers) and the materials used in the copolymerization are supplied slowly to a reactor while maintaining conditions causing copolymerization to proceed until the reactor is filled. The stated supply and conditions are then continued until the total supply is in the range of from about 1.5 to about 5, preferably from 2 to 4, reactor volumes.

As materials are added to the filled reactor, a corresponding amount of the reactor contents spills out of the reactor into one or more vessels in which the copolymerization reaction is completed. Additional initiator components are added conveniently to the storage vessels or to the reactor or the combination of all of the foregoing to complete the copolymerization.

As will be apparent, the supply of materials and the conditions of reaction are such that copolymerization proceeds to minimize the proportion of unreacted monomers in the reactor, usually to maintain (once the reactor is filled) less than about 10% of unpolymerized monomers in the reactor based on the total weight of monomers supplied to the reactor.

When the amount of material to be copolymerized has all been supplied to the reactor, the reaction can be completed in that reactor, or preferably, the contents of the reactor is then transferred into one or more of the vessels which are used to receive the contents of the reactor. These vessels are usually insulated tanks, and the copolymerization is completed therein because the elevated temperature present in the material which is removed from the reactor causes the polymerization to go to completion with time. Small amounts of polymerization initiators may also be added to assist in converting the residual monomers to polymers, as previously noted.

Each reactor volume is regarded to represent one phase of the continuous polymerization, and the total supply to the reactor referred to previously is termed a cycle in the process. In actual practice, many cycles of the process are carried out in succession to give as much product as desired.

In preferred practice, the reactor is partially emptied during the latter part of the monomer addition in the last phase of each cycle to minimize the time interruption between cycles. At the end of the monomer addition, the remaining latex is expelled from the reactor, which is immediately charged with water for the first phase of the next cycle. Phase 1 of each cycle preferably utilizes a monomer premix as opposed to a pre-emulsion so that all of the water can bne pre-charged to obtain maximum heat transfer. By following these procedures, the process can be operated nearly as efficiently as a fully continuous process.

After the polymerization reaction from each cycle has been completed in the various vessels which are supplied by the material spilling out of the reactor, the contents of these vessels are combined and admixed together.

It is found that the proportion of particles of excessive size increases as the cycle proceeds with time. By using a short cycle, as measured by the number of reactor volumes used (the number of phases employed), particle growth is limited and the particles of excessive size are minimized or entirely avoided. The results of this invention will be more fully illustrated later.

As a matter of interest, it is known in continuous polymerization using a single continuously stirred tank reactor that the average particle size usually varies cyclically as the polymerization proceeds, and the size distribution continues to broaden. In the present process, the generation of large particles is avoided by terminating the polymerization while the particle size distribution is still narrow.

The elimination of particles of excessive size causes the resin particles to function with improved efficiency. As a result, the aqueous latex paint product exhibits improved gloss and scrub resistance which are factors known to be enhanced by increasing the proportion of binder in the paint. In this invention these factors are improved without increasing the proportion of binder in the paint, but are instead improved by using that binder more efficiently. More particularly, and with a given proportion of resin in the paint, a larger amount of flatting pigments can be added to provide the desired gloss, and the costs are lowered because the flatting pigments are inexpensive.

It is also possible to vary the composition of the monomers which are charged during the process. Thus, adhesion promoting monomers can be added last so that they are more efficiently employed. In this way we can reduce the proportion of adhesion promoter without loss of adhesion, and the reduced proportion of the promoter enhances scrub resistance.

Similarly, vinyl acetate is a desirable inexpensive monomer, and we can use it in larger than normal proportion at the beginning of the cycle and in reduced proportion at the latter part of the cycle. In this way the monomers added towards the end of the cycle can be made to cover the polymer particles in the reactor (in the manner of a core-shell structured particle) and allow the use of a larger than normal proportion of vinyl acetate without degrading properties.

It will be understood that in continuous processing, materials can be added continuously or in increments, and these two alternatives are considered to be equivalent to one another and are embraced herein by the language "slowly adding".

BRIEF DESCRIPTION OF THE DRAWINGS

An understanding of the achievement provided by this invention will be facilitated by reference to the drawings in which.

DETAILED DESCRIPTION OF THE INVENTION

Figure 1:
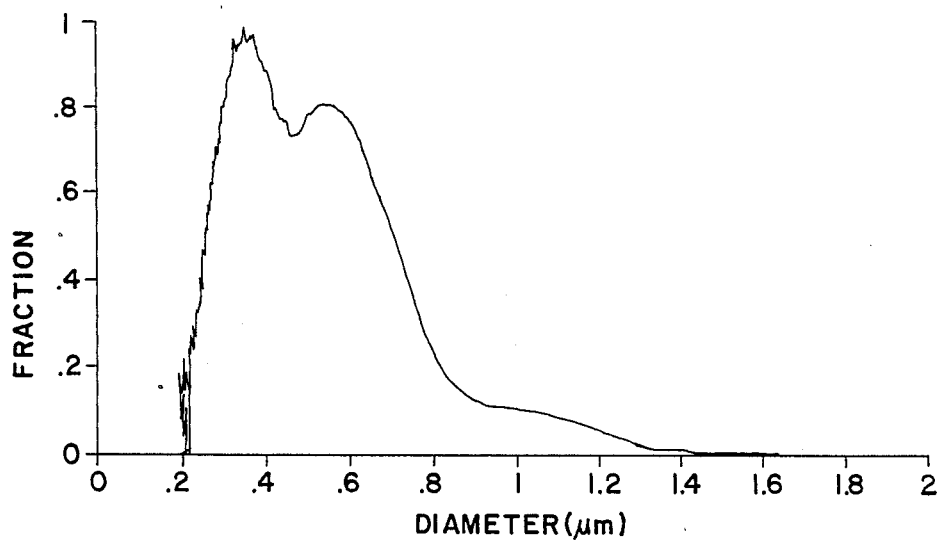
FIG. 1 is a graph of a weight average particle size distribution curve of fraction vs. diameter (in micrometers) for a copolymer produced by a continuous process using a seed latex.

Referring more particularly to the aqueous emulsion copolymerization which is carried out, monoethylenically unsaturated monomers, water, surfactant and catalysts are slowly added to the reactor. The reactor is usually initially heated to establish the desired reaction temperature. Full cooling is then utilized to contain the exothermic polymerization reaction so that the additions to the reactor can be made as rapidly as is allowed by the available cooling without exceeding the desired polymerization temperature. Maximum throughput rates are thereby typically obtained. The speed of the reaction is also determined by the catalysts which are selected, albeit all of this is entirely conventional and adequately illustrated in the examples.

The monomers which are copolymerized are well known. These are generally monoethylenically unsaturated and are selected primarily to provide a glass transition temperature which is appropriate for an air-drying latex paint. Generally this represents a glass transition temperature of from $-30°$ C. to $20°$ C., more preferably from $-10°$ C. to $10°$ C. Acrylic esters and vinyl acetate are most usually employed in aqueous latex paints, albeit other softening monomers, such as ethylene, are also used in some instances (for example the ethylene is used in combination with vinyl acetate). For interior paints we prefer to employ copolymers of a major weight proportion of vinyl acetate, styrene, vinyl chloride or vinylidene chloride, with a minor weight proportion of an acrylate ester, such as n-butyl acrylate. The monomers constituting at least about 95% of the copolymer are selected to be non-reactive, except for the single ethylenic group, although up to about 4% of the monomers may be reactive, as is well known. These are illustrated by the presence of a small proportion of acrylic or methacrylic acid which aids the copolymerization and enhances adhesion. Very small amounts of polyacrylates can also be used, such as trimethylol propane triacrylate. While indoor paints containing a large amount of vinly acetate are preferred, outdoor paints which are largely constituted by a copolymer of butyl acrylate or ethyl acrylate and methyl methacrylate having the desired glass transition temperature can also be used.

The aqueous emulsion copolymers form a latex which is then pigmented in conventional fashion to form a latex paint. The proportion of the pigment is varied depending upon the gloss which is desired.

The invention is illustrated in the Examples of preferred operation which follow:

EXAMPLE 1

A 2.0 liter pyrex continuous stirred tank reactor was set up with a variable speed agitator and an overflow tube adjusted to maintain a reactor volume of 1500 ml of liquid in the reactor.

A monomer premix (A) was prepared by mixing 634.5 grams of vinyl acetate, 105.0 grams of n-butyl acrylate, 0.74 gramms of glacial acrylic acid and 0.59 grams of a blend of mineral oil and siliconized silica sold under the name Drewplus Y-250 defoamer (made by Drew Chemical Company).

An initiator solution (B) was prepared by mixing 9.48 grams of a 70% aqueous solution of tert-butyl hydroperoxide in 73.74 grams of deionized water. A reducing solution (C) was prepared by mixing 4.44 grams of sodium formaldehyde sulfoxylate with 51.07 grams of deionized water.

A monomer pre-emulsion (D) was prepared for phases 2 and 3 described hereinafter as follows.

1131.6 grams of deionized water was sparged with nitrogen for 15 minutes (at a rate of 40 ml/min) and the following were added with good mixing:
1. 84.6 grams of a 70% aqueous solution of a 40 mole ethoxylate of octylphenol;
2. 6.0 grams of dioctyl sodium sulfosuccinate (Siponate DS-10 can be used)
3. 2.1 grams of a 1.0% aqueous solution of the sodium salt of iron ehthylenediaminetetraacetic acid chelate containing 13% iron;
4. 1253.8 grams of vinyl acetate;
5. 207.2 grams of n-butyl acrylate;
6. 1.5 grams of glacial acrylic acid;
7. 3.0 grams of trimethylolpropane triacylate;
8. 16.5 grams of a ureido adhesion promotor (Sipomer WAM, available from Alcolac Corporation can be used);
9. 1.2 grams of siliconized silica sold under the name, Drewplus Y-250 defoamer.

PHASE 1

The reactor was charged with the 566.7 grams of nitrogen-sparged deionized water and item 1, 3.02 grams of item 2, and 1.05 grams of item 3 were added and the reactor contents were heated to 45° C. while stirring (238 rmp). Then 74.0 grams of monomer premix (A) were added. Seven minutes later a feed of initiator solution (B) was begun at a rate of 0.14 grams/min and a feed of reducing solution (C) at 0.09 grams/min. Seventeen minutes later the batch temperature had risen to 56° C., and a continuous feed of premix (A) was begun at a rate of 3.70 grams/min. The temperature was held at 59°-64° C. during the monomer addition period (which lasted approximately three hours).

PHASES 2 AND 3

Following the addition of premix (A), the addition of monomer pre-emulsion (D) was begun at a rate of 7.52 grams/min while continuing the additions of initiator solution (B) and reducing solution (C). The reactor contents built up and finally overflowed into a collecting tank. When all the materials had been added to the reactor, the contents of the reactor were maintained at a temperature of 62°-67° C. until the conversion of monomer to copolymer was complete. The contents of the reactor was then allowed to cool to room temperature (25° C.) and all portions of the product were combined with stirring to provide a combined product of uniform character.

While the product can be accepted as it now stands, we prefer to further minimize the presence of unreacted monomers, and this can be done by adding additional catalyst as described below at room temperature. Thus, 2.1 grams of 70% aqueous tert-butyl hydroperoxide and 9.66 grams of 10% aqueous sodium formaldehyde sulfoxylate were added to the combined product provided previously to reduce the free monomer level, so after standing for about 10 minutes the vinyl acetate content was reduced to below 0.1% and the latex had a nonvolatile content of 54.8%. The particle size was 0.218±0.040 micron (measured by Coulter N-4 Unimodal method), the Brookfield Viscosity was 100 centipoises (with a #2 spindle at 20 rpm). The product had a pH of 6.8 and was stable when agitated for 15 minutes with a Hamilton Beach mixer. It weighed 9.05 pounds per gallon.

This latex was formulated into a conventional white semi-gloss paint having a resin solids content of 27.88% by volume with rutile titanium dioxide in a pigment to volume concentration of 18.98%, and thickened with a cellulosic thickener to provide a Stormer viscosity of 91 Krebs units. This paint was compared for wet adhesion, scrub resistance (cycles to failure), and gloss with a control paint of the same formulation but made using a commercially available latex produced continuously using a single continuously stirred tank reactor. The results showed both products had excellent adhesion, but the product of this Example was more scrub resistant (resisted 2917 cycles against 2025 for the commercial control) and the gloss was greater (the 60° gloss reading was 68.0% against 59.5% for the commercial control).

Repeating the reaction by reducing the n-butyl acrylate content by 5% during the first part of the cycle and increasing it by 5% during the latter part of the cycle provides a product having enhanced scrub resistance.

The proportion of Sipomer WAM adhesion promoter (American Alcolac Company, Baltimore, Md.) can be reduced 20% byy confining the addition of this component to the latter part of the cycle.

Figure 2:
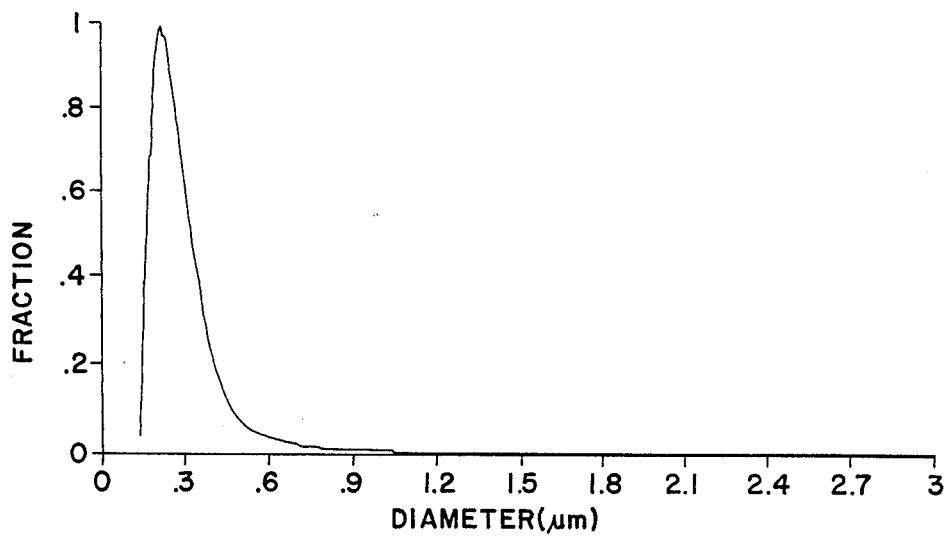
FIG. 2 is a graph of a weight average particle size distribution curve of fraction vs. diameter (in micrometers) for a copolymer produced by a semi-continous process in accordance with this invention.

FIGS. 1 and 2 are weight average particle size distribution curves for a copolymer produced by a continuous process using a seed latex and for the semi-continuous process of the present invention, respectively. These curves were generated by a Brookhaven DCP-1000 particle size analyzer available from Brookhaven Instrument Corp., Holtsville, N.Y. under conditions specified in the operating procedures.

Although the compositions analyzed were not precisely the same, the minor differences between these do not significantly effect the relative particle size distributions. Moreover, although the scales on the abscissa are different in the two figures, the particle size distribution of FIG. 2 (which shows the copolymer produced by the method of the present invention) is greatly reduced as compared to the distribution of the control reported in FIG. 1 (the copolymer produced by a continuous process with a seed latex).

The monomer compositions polymerized in the comparison reported in the drawings are tabulated below.

TABLE

| Monomer | FIG. 1 | FIG. 2 |
|---|---|---|
| Vinyl acetate | 84.32 | 84.97 |
| Butyl acrylate | 14.36 | 14.05 |
| Acrylic acid | 0.05 | 0.10 |
| Ureido monomer* | 1.00 | 0.75 |
| Trimethylol propane triacrylate | 0.27 | 0.13 |

In both compositions the particle size of the copolymer product started at about 0.2 micrometers. But it is obvious to see that the FIG. 2 composition of this invention had very few particles larger than 0.6 micrometers, and hardly any larger than 0.8 micrometers. In contrast, the prior art particle size distribution shown in FIG. 1 included a large proportion of particles larger than 0.8 microns and there were more particles larger than 1.2 micrometers than there were particles larger than 0.6 microns in the invention.

What is claimed is:

1. A method of carrying out a semicontinuous aqueous emulsion copolymerization using a single continuously stirred tank reactor to reduct the particle size distribution of the copolymer product comprising, supplying to said reactor the materials used in the copolymerization including the monomers which are copolymerized while maintaining conditions causing copolymerization to proceed until the reactor is filled, continuing said supply while maintaining said conditions until the total supply is in the range of from about 1.5 to about 5 reactor volumes, the excess material in the reactor being removed therefrom and collected in one or more separate vessels in which the copolymerization reaction is completed, and then combining and mixing together all of the product of the copolymerization.

2. A method as recited in claim 1 in which the reaction is carried out to a total supply of from 2 to 4 reactor volumes.

3. A method as recited in claim 1 in which the rate of supply to said reactor and the conditions which are maintained in the reactor are such as to cause the presence of less than about 10% of unpolymerized monomers in the reactor once the reactor is full, based on the total weight of monomers supplied to the reactor.

4. A method as recited in claim 1 in which additional catalyst is added to the combined product to minimize the proportion of unreacted monomers.

5. A method as recited in claim 1 in which the composition of the monomers supplied to the reactor is varied as the reaction proceeds.

6. A method as recited in claim 1 in which said monomers comprise a major proportion of vinyl acetate and a minor proportion of n-butyl acrylate.

7. A method as recited in claim 6 in which the composition of the monomers supplied to the reactor is varied as the reaction proceeds with the n-butyl acrylate content being increased at the end of the reaction.

8. A method as recited in claim 1 in which water is added to the reactor followed by the separate addition of the monomers to be copolymerized.

9. A method as recited in claim 8 in which the remaining latex is expelled from the reactor after the total material supply to the reactor has been completed, and then the reactor is immediately charged with water to start the next cycle to thereby minimize the time interruption between cycles.

* * * * *

UNITED STATES PATENT AND TRADEMARK OFFICE
CERTIFICATE OF CORRECTION

PATENT NO. : 4,946,891

DATED : August 7, 1990

INVENTOR(S) : James E. Devona and Gregory D. Shay

It is certified that error appears in the above-identified patent and that said Letters Patent is hereby corrected as shown below:

Col. 2, line 39, "bne" should be --be--
Col. 4, line 61, after "from" insert --American--
Col. 5, line 3, "rmp" should be --rpm--
Col. 5, line 67, "byy" should be --by--
Col. 6, line 29 (end of table), insert --*adhesion promoter--
Col. 6, line 42, "semicontinuous'' should be --semi-continuous--
Col. 6, line 44, "reduct" should be --reduce--

Signed and Sealed this

Twenty-fourth Day of December, 1991

Attest:

HARRY F. MANBECK, JR.

Attesting Officer     Commissioner of Patents and Trademarks